Figure 9:
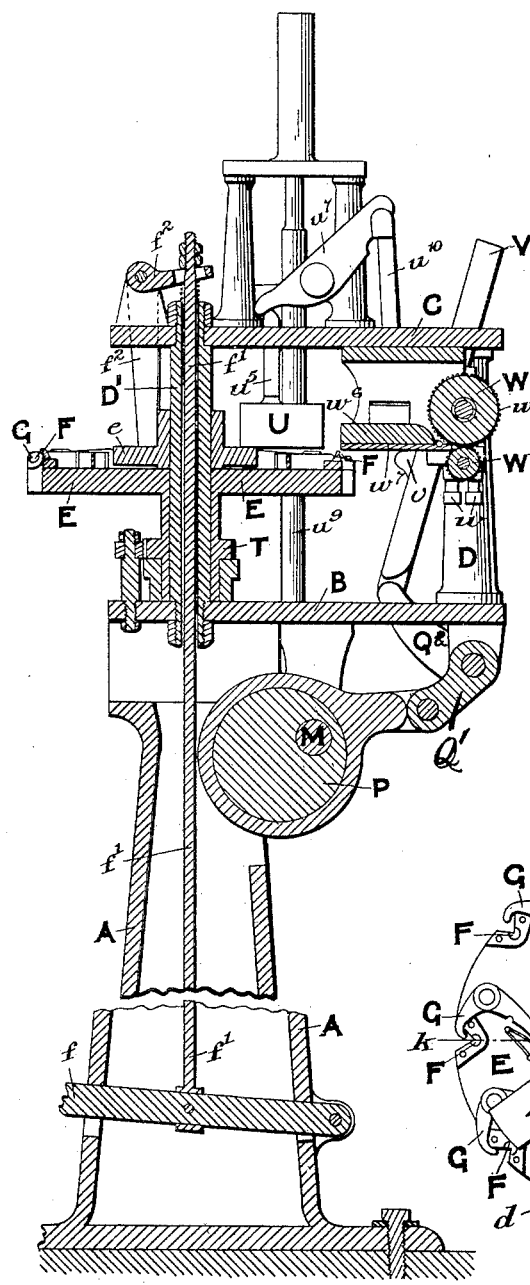

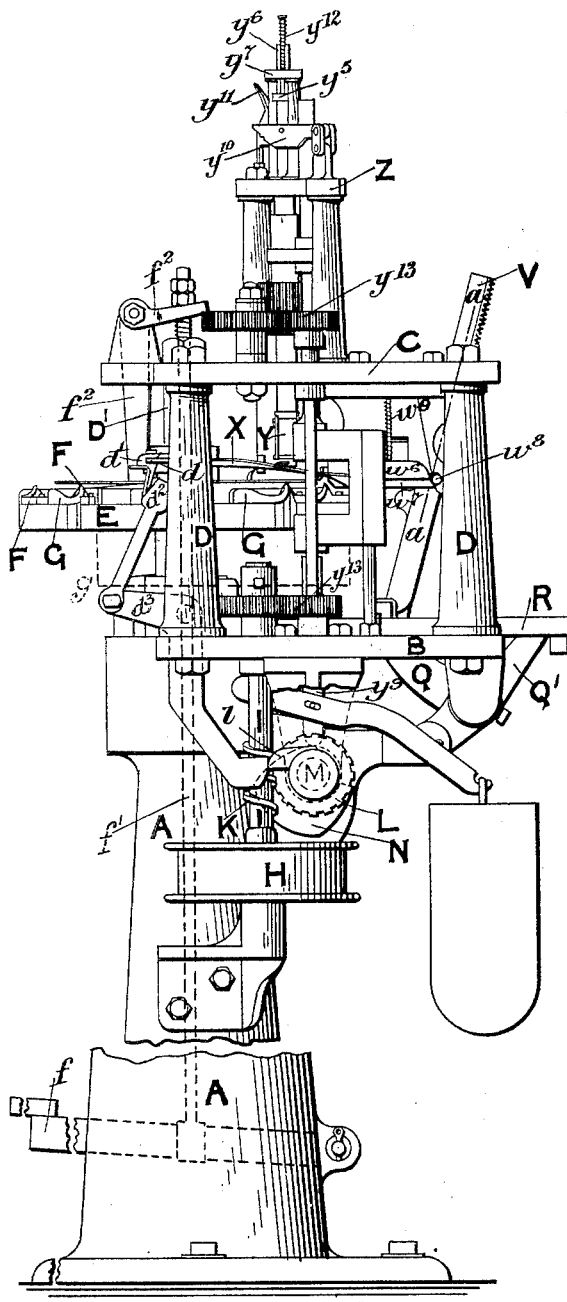
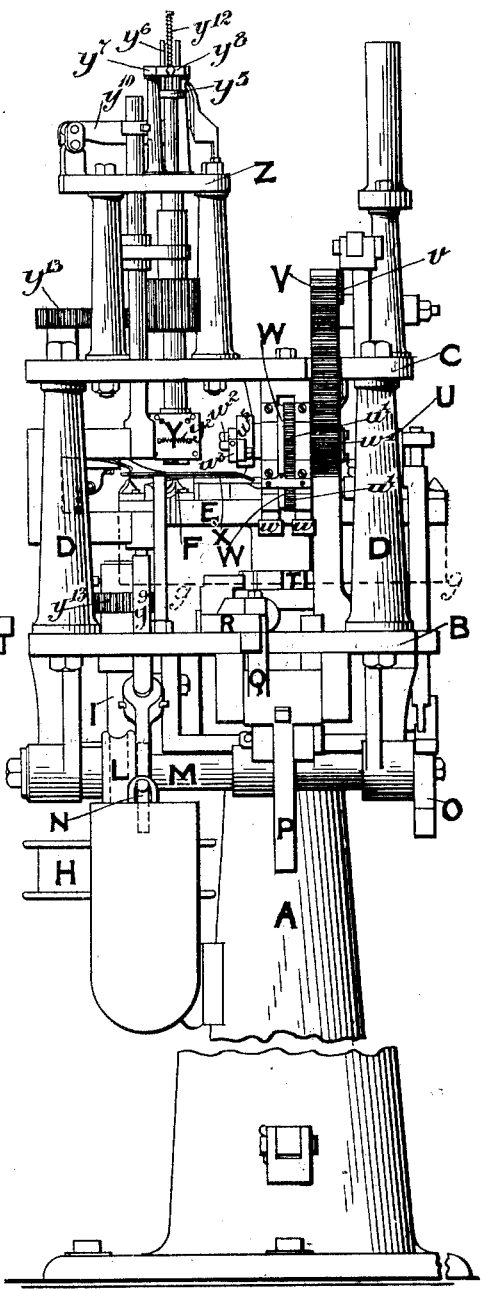

No. 675,701. Patented June 4, 1901.
F. T. ADAMS.
LACE MACHINE.
(Application filed Oct. 31, 1899.)
(No Model.) 5 Sheets—Sheet 2.
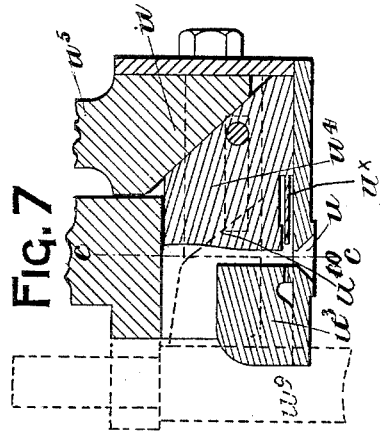
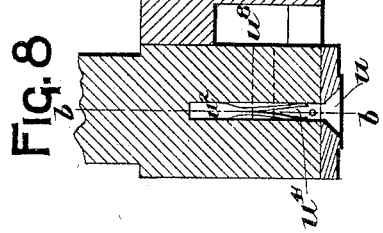
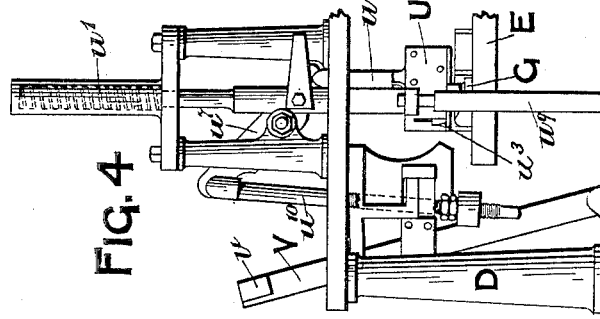
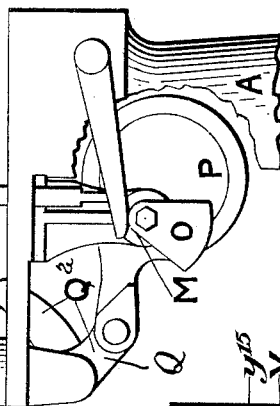
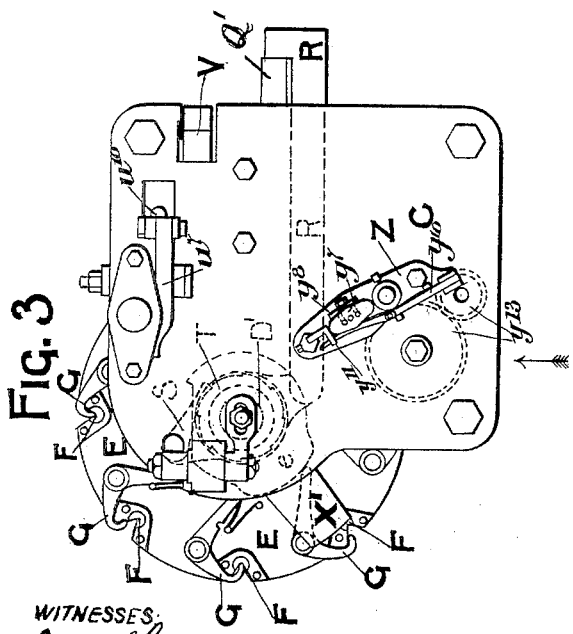
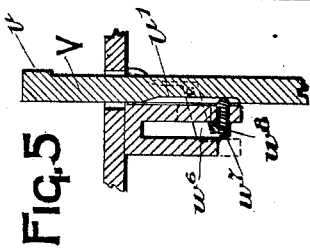
WITNESSES:
Ella L. Giles
INVENTOR
Frederick Thomas Adams
BY
Richardson
ATTORNEYS
THE NORRIS PETERS CO., PHOTO-LITHO., WASHINGTON, D. C.

No. 675,701. Patented June 4, 1901.
F. T. ADAMS.
LACE MACHINE.
(Application filed Oct. 31, 1899.)
(No Model.) 5 Sheets—Sheet 3.

WITNESSES:
INVENTOR
Frederick Thomas Adams
ATTORNEYS

No. 675,701. Patented June 4, 1901.
F. T. ADAMS.
LACE MACHINE.
(Application filed Oct. 31, 1899.)
(No Model.) 5 Sheets—Sheet 4.
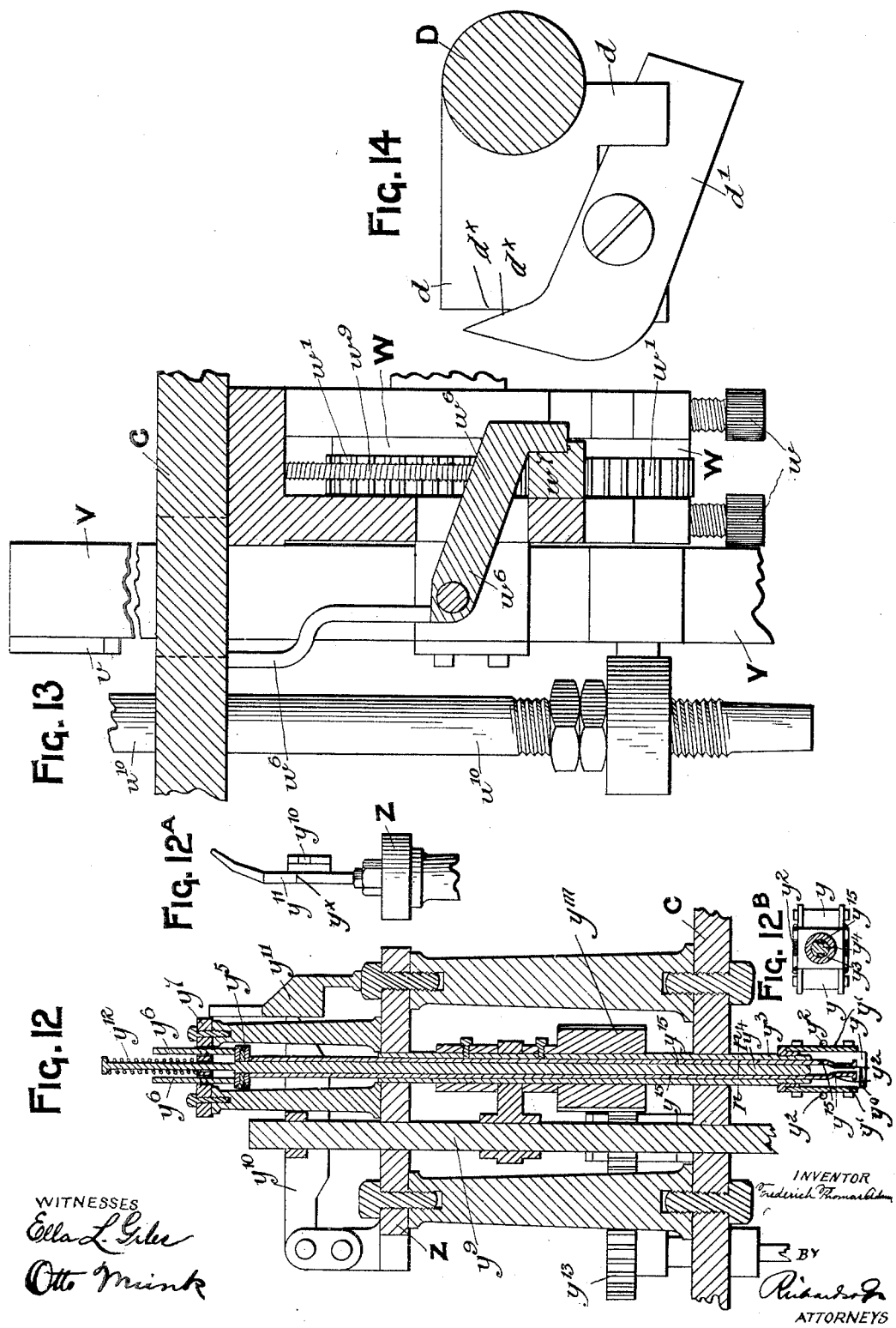

No. 675,701. Patented June 4, 1901.
F. T. ADAMS.
LACE MACHINE.
(Application filed Oct. 31, 1899.)
(No Model.) 5 Sheets—Sheet 5.

WITNESSES
Ella L. Giles
Otto Munk

INVENTOR
Frederick Thomas Adams
BY Richardson
ATTORNEYS

THE NORRIS PETERS CO., PHOTO-LITHO., WASHINGTON, D. C.

UNITED STATES PATENT OFFICE.

FREDERICK THOMAS ADAMS, OF DERBY, ENGLAND.

LACE-MACHINE.

SPECIFICATION forming part of Letters Patent No. 675,701, dated June 4, 1901.

Application filed October 31, 1899. Serial No. 735,386. (No model.)

*To all whom it may concern:*

Be it known that I, FREDERICK THOMAS ADAMS, a subject of the Queen of Great Britain and Ireland, and a resident of 25 Howard street, in the county borough of Derby, England, have invented a certain new and useful Machine for Forming Spiral Tags on Boot and other Laces and the Like, (for which I have applied for Letters Patent in the United Kingdom of Great Britain and Ireland, the said application being numbered 7,988 and bearing date April 17, 1899,) of which the following is a specification.

The objects of my invention are to provide a continuously-operating machine for automatically cutting, pointing, and piercing the ends of laces and for feeding and cutting off lengths of wire, threading them through the laces and twisting the ends of the wire about the same, and finally severing the ends of the wire after they have been twisted to a point.

To this end the invention includes a table carrying a series of grippers for the lacings, means for rotating the table intermittently or step by step, and a series of stations with which the grippers aline at the termination of each step, the means for pointing and piercing the lacing being located at one station, the means for feeding the wire, threading the same through the hole pierced in the lacing, and severing the wire being located at another station, the means for twisting the wire about the end of the lacing being located at a third station, and the means for cutting off the ends of the twisted wire being located at the last station, and means for simultaneously operating the several groups of mechanism, whereby while the mechanism at one station is performing its functions those at the other stations will likewise perform the functions for which they are designed.

In describing my invention reference will be had to the accompanying sheets of drawings, upon which—

Figure 10:
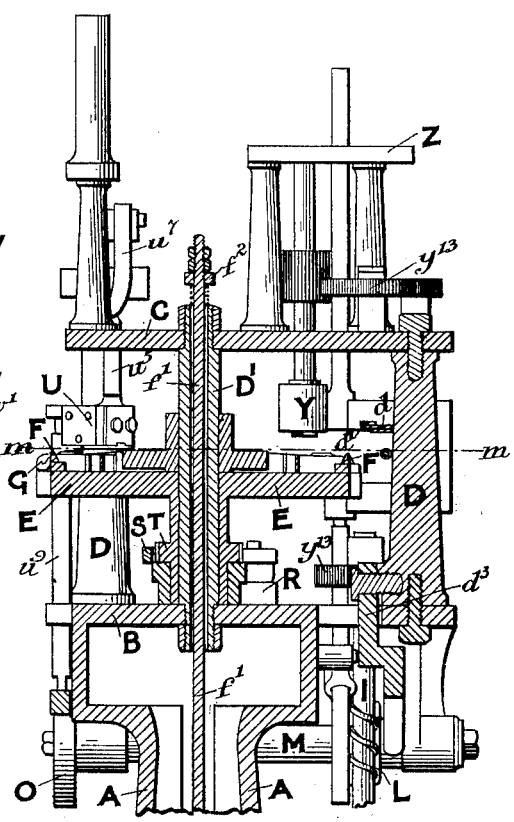
Figure 11:
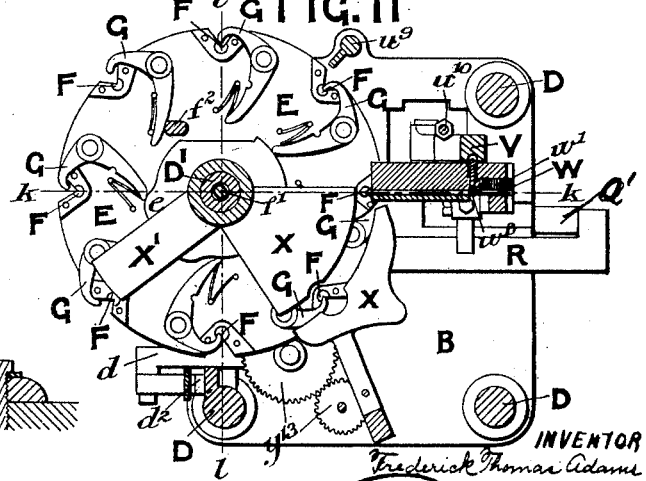
Figure 15:
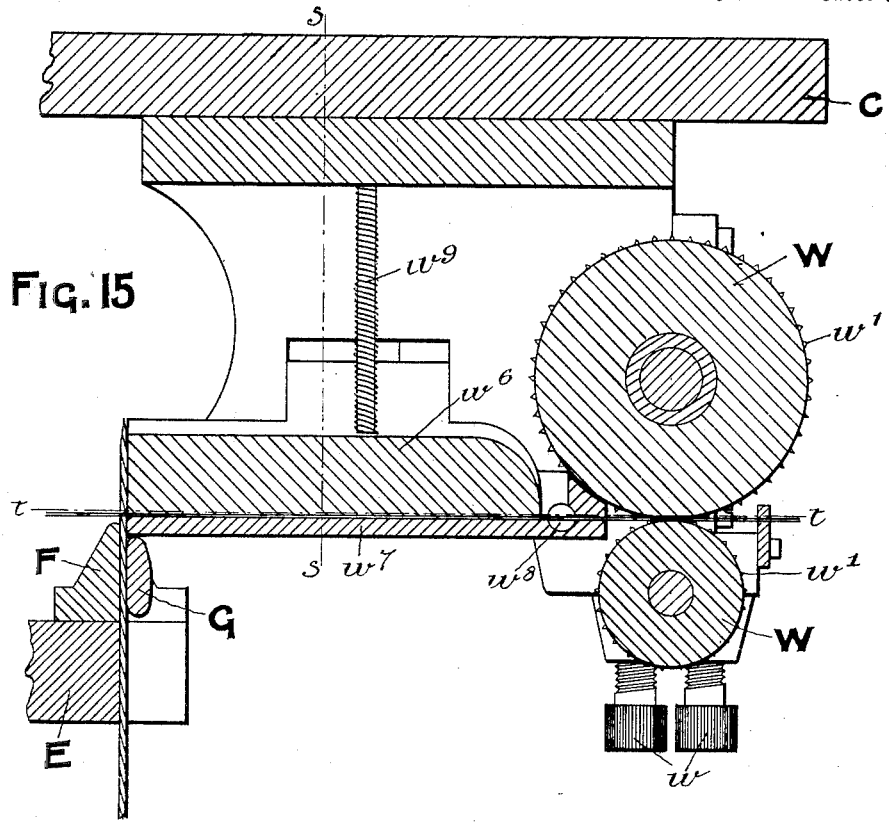
Figure 16:
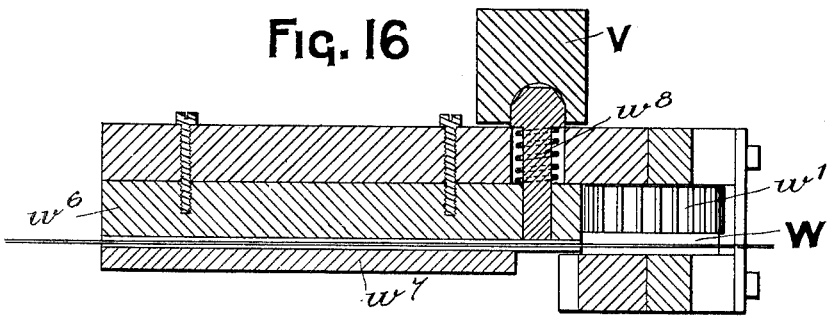
Figure 17:
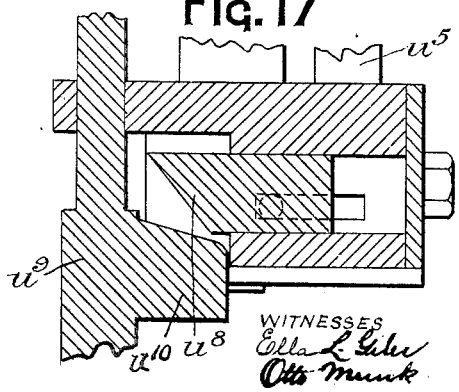
Figure 18:
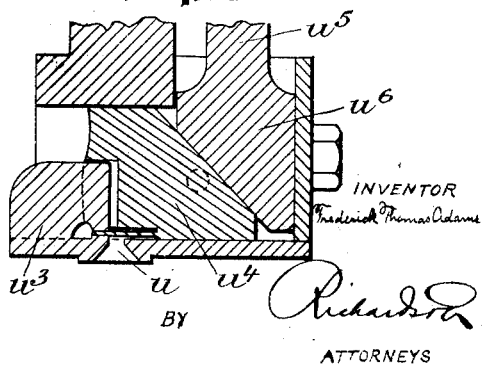

Figure 1 is a front elevation of my improved machine viewed from the driving end in the direction of the arrow on Fig. 3. Fig. 2 is a side elevation of my improved machine looking from right to left of Fig. 3. Fig. 3 is a plan of the upper platform and part of the top side of the revolving table to be hereinafter described. Fig. 4 is a part back elevation showing the eccentric, outer cam, and cutting and piercing device to be afterward explained. Fig. 5 is a sectional detail view showing the means for operating the wire-guide. Fig. 6 is a greatly-enlarged section taken longitudinally through the twisting device to be hereinafter explained. Fig. 7 is also a greatly-enlarged longitudinal section through cutting and piercing device on line $b\,b$ of Fig. 8. Fig. 8 is a cross-section on line $c\,c$ of Fig. 7. Fig. 9 is a vertical sectional elevation on line $k\,k$ of Fig. 11. Fig. 10 is a vertical sectional elevation on line $l\,l$ of Fig. 11. Fig. 11 is a sectional plan on line $m\,m$ of Fig. 10. Fig. 12 is an enlarged vertical sectional view showing the wire-twisting mechanism. Fig. 12$^a$ is an elevation of a detail of this mechanism. Fig. 12$^b$ is a further detail. Fig. 13 is an enlarged section on line $s\,s$ of Fig. 15, illustrating the wire-feed. Fig. 14 is an enlarged detail plan view of cutting-off device. Fig. 15 is an enlarged vertical sectional view of the wire-feed cutter. Fig. 16 is a sectional view on line $t\,t$, Fig. 15. Fig. 17 shows details of the mechanism for moving the parts shown in Fig. 18 from the position shown therein to that shown in Fig. 7. Fig. 18 shows piercer and movable blade of the lace-cutter in an advanced position, in Fig. 7 these parts being shown retracted.

In carrying out my invention I provide a pillar or frame A, upon which are mounted or arranged the different parts of the machine, as will be hereinafter explained. Upon this said pillar are fixed a lower and an upper platform B and C, between which are interposed supporting-columns D. On the lower platform B is mounted a table E, revolving upon a spindle D', fixed at its ends in platforms B and C, which carries on its upper face near its periphery a plurality of cones spaced an equal distance apart and having axial bores. Lateral slots lead thereto through the edge of the table and cones to admit of the end of a lace being placed in each bore. A spring-pressed jaw G is pivoted to the top of the table in proximity to each cone, the extreme hooked end of which firmly grips the end of the lace in the cone. (See plan of table, Figs. 3 and 11.) Each cone in turn, as the table is rotated, comes to the different stations where the devices for cutting, pointing, and piercing the lace, feeding, cutting, and twisting the wire, and finally cutting off the ends of the twisted wire are located.

The whole apparatus is driven from a pulley H, fast on vertical spindle I, upon which is also mounted a worm K, communicating motion through a worm-wheel L to a cam-shaft M, journaled in brackets depending from the platform 3, this shaft carrying two cams N and O and an intermediately-located eccentric P. As the cam-shaft M revolves, the eccentric P moves a complex lever Q to and fro. This complex lever consists of three integral arms, one arm, Q, being connected to and driven by the eccentric P, another arm, $Q^2$, operating the wire-feeding device, and the third arm, $Q'$, operating the device for rotating the table through a connecting-rod R, a pawl S, and ratchet-wheel T, (the latter being fixed to and underneath the revolving table E,) thus rotating the table step by step. After a lace is placed in the carrying-gripper the table is revolved one step, which will bring the slotted cone in which said lacing has been placed under the cutting and piercing device U, which is the first station. When the parts are in this position, the outer cam O will allow the cutting and piercing device to descend under influence of spring $u'$, Fig. 4. (The cam is shown in its lowest position in this figure.) This device U has a recessed cone $u$ in its base (see Figs. 7 and 8) adapted to accurately fit the cones on the table, and when pressed over the same by spring $u'$ acts as a retainer to keep the table stationary while the several operations at the different stations are taking place. When this device descends, the end of the lacing passes into a slotted opening $u^2$, in which is fixed a stationary pointed knife or blade $u^3$, the projecting rear end of which is shown in Fig. 4. A sliding inverted-V-shaped knife or blade $u^4$ coacts with the blade $u^3$ to shear off the edges of the lacing which project beyond the sides of blade $u^3$, so that the end of the lacing is cut to form a tapering point. The blade $u^4$ has formed integral therewith a piercer $u^\times$, which as the blade $u^4$ advances to sever the edge of the lacing pierces the same. For sliding the inverted-V-shaped knife $u^4$ and piercer $u^\times$ forward to perform this action an inclined block $u^6$, carried by a rod $u^5$, is provided, the latter being pressed down by an arm $u^7$, connected to the rack which is reciprocated by lever Q. The sliding knife is brought back into its normal position by means of another inclined block, $u^8$, Fig. 8, with which a tongue $u^{10}$ on the lifting-rod $u^9$ coacts, (see dotted lines on Figs. 7 and 17,) and the whole cutting and piercing device is finally removed from the table by the lifting-rod $u^9$ being raised by cam O. In the first movement in the ascent of this rod it pushes back the sliding knife and piercer, as already described, without lifting the mechanism from the table, as said rod is formed in two sections which have a slight independent longitudinal movement in relation to each other. In the final ascending movement of the rod it lifts the entire cutting and piercing mechanism free of the table, and the latter rotates one tooth of the ratchet-wheel T, which brings the cut and pierced lace in alinement with the wire feeding and cutting mechanism located at the second station.

The wire is fed from a reel in any suitable position through a pair of rollers W W, (see Fig. 15,) having means to adjust them relative to each other to insure perfect feed, milled headed screws $w\ w$ being provided for this purpose. These rollers carry intermeshing gears, so that they will rotate simultaneously.

It is desirable that the rollers shall rotate in but one direction, as they only feed the wire forward, and as they are driven through the intermediary of the reciprocating rack or ratchet-bar V means must be provided to prevent them rotating rearwardly as the rack-bar retracts. In the present instance such means comprises a pinion $w^4$, Fig. 2, fixed to the axle upon which upper roller $w'$ is free to rotate, with which the rack-bar V intermeshes to rotate the same. The opposite end of this axle carries a pawl $w^3$, which engages a ratchet-wheel fixed to the wheel carried by the upper roller W. By this means the rollers W W are revolved in one direction only. The wire is fed by the rollers through guides $w^6$ and $w^7$ (see Figs. 13, 15, and 16) and passes through the hole pierced in the lace. This guide comprises a lower stationary member $w^7$, having a recessed face in which a longitudinally-extending shallow channel is located, in which the wire rests, and an upper pivotally-supported member normally pressed down by a spring $w^9$. (See Figs. 13 and 15.) As the table revolves it brings the cut lacing flush against the end of the guide, with the hole pierced in the lacing in horizontal alinement with the guide-channel, so that as the wire is fed forward it will pass through said hole. (See Fig. 15.) The top part of the guide $w^6$ is then raised by means of a projection on the rack V, (see Figs. 1 and 13,) and at the same time a cutter $w^{18}$ (see Fig. 16) is moved forward by an inclined plane $v'$ (see Fig. 5,) in the rack V as the latter moves downward and cuts off the desired length of wire. The guides now being opened, the wire moves forward out of the said guides by the action of the table commencing to revolve one more tooth, which brings it in position for twisting the wire. The wire, which projects about three inches on each side of the lacing, rests upon the two plates X X as the table moves to bring the lacing, with the wire threaded through the same, to the wire-twisting station. One of these plates, as shown in Fig. 11, is supported by a bracket secured to platform B, while the other plate is secured to axle D'. A space is left between the plates for the passage of the lacing. The twisting mechanism Y is held up from the table until the pointed lace alines therewith by means of the controlling-cam N. The twisting mechanism comprises a pair of jaws $y$ $y$, (see Figs. 6 and 12,) pivoted between two side plates $y'$ $y'$, said jaws being connected to each other by springs $y^2$. (See Figs. 2, 12, and $12^b$.) The plates are carried by a hollow spindle $y^3$, (see Figs. 6 and 12,) through which passes a plunger $y^4$, the end of which is suitably shaped for spreading the jaws $y$ $y$ to grip the wire to be twisted. The sides of the plunger are grooved, Figs. 12 and $12^b$, to receive a pair of pincers or jaws $y^{15}$, which pass upward and are connected by means of the collar $y^5$ (see Figs. 2 and 12) to short rods $y^6$, which extend through the small top plate $y^7$, to which is adjustably secured a plate $y^8$, Fig. 2, carrying springs having bearings on the rods $y^6$ to put a tension thereon to prevent the pincers rising until forced up by the cam N. The hollow spindle is connected to a suitably-weighted lifting-rod $y^9$, (see Figs. 1, 2, and 12,) the lower end of which rests upon the cam N, while the upper end thereof is pivotally connected centrally of a small arm or lever $y^{10}$, pivotally connected at one end to a part of the machine-framing. The free end of lever $y^{10}$ coacts with a controlling-cam rod $y^{11}$, Figs. 1, 2, and $12^a$, which during the downward movement of rod $y^9$ and lever $y^{10}$ forces the latter over against rod $y^4$, so that it will engage a projection on the latter and move said rod downward against the tension of spring $y^{12}$. When the lever $y^{10}$ passes below shoulder $y^{\times}$ on part $y^{11}$, it springs out of engagement with projection on rod $y^4$, allowing the same to ascend under influence of spring $y^{12}$, while the lever moves up on the opposite side of part $y^{11}$. As the plunger is forced downward the end thereof comes into contact with inclines $y^2$ on pincer-jaws $y^{15}$ and spreads the same to permit them to pass over the end of the lacing. The jaws $y$ are also spread by this end of the rod to present the wire to be grasped, each jaw having a recess or pocket $y^0$ in its face to receive said wire, these pockets being placed on opposite sides of the center of the jaws, Fig. 12 showing the location of this recess in one jaw. Immediately the wire is inclosed by the jaws the end of the lever $y^{10}$ passes below shoulder $y^{\times}$, and said lever springs out of engagement with the projection on the side of plunger $y^4$, thereby permitting of a spring $y^{12}$ to lift the latter. The jaws come together, and at the same time the pincers $y^{15}$ (see Fig. 6) grip or take hold of the lace to hold it steady during the twisting operation. The jaws are now rotated to twist the wire about the end of the lacing by means of a pinion $y^m$, secured thereto, Fig. 12, with which upper gear $y^{13}$ engages, the latter being rotated from spindle I. The cam N gradually raises the lifting-rod $y^9$ and the whole of the twisting device as the wire is twisted around the end of the lace. By one more step of the table the lace having the wire wrapped about the end thereof comes to the station at which mechanism for cutting off the ends of the twisted wire is located. This mechanism comprises a stationary blade $d$, secured to a pillar D', (see Figs. 1, 11, and 14,) to which is pivoted a second blade $d'$, operated by the inclined end $d^2$ of a link $d^{\times}$ of a bell-crank lever $d^3$ through the medium of a projection $l$ on the side of the worm-wheel L. The blades $d$ $d'$ have coacting shearing edges $d^{\times}$, which cut off the ends of the wire and so finish the tag.

For opening the spring-jaws G after the wire ends have been cut off a cam $e$ is employed on the top of the table E, which is fixed to the spindle D'. This cam engages one end of each spring-jaw as it comes around, (see Fig. 11,) thus releasing the lace which now drops out of its holding-cone. I may provide any suitable means for expelling the lace from the slotted cone, such as the plate $x'$, fixed on the cam $e$ to engage the lace as the table passes around.

To open the jaws while the lace end is being put in, I may either employ the same cam or one to be operated by means of a treadle $f$ and rod $f'$, engaging and operating the lever $f^2$, which comes in contact with each jaw as it comes around.

Any suitable trough or conduit will be provided to keep the laces out of the working parts of the machine while they pass around. This is shown by dotted lines $g$.

The machine may be driven in any suitable manner, such as by treadle or power, and it will be understood that although I have described it in the form I at present prefer I do not wish to bind myself to the exact arrangement or details mentioned herein, it being evident that without departing from the spirit of my invention various slight alterations may be made therein.

I claim as my invention—

1. In a machine for providing wire tips on lacings, in combination, a table having a series of lace-carriers, means for rotating the table step by step, a plurality of stations at which each carrier is adapted to successively aline, means at the first station for pointing and piercing the lacing, means at the second station for threading a wire therethrough and cutting off a length of the same, means at the next station for twisting said wire about the pointed end of the lacing, means at the following station for cutting off the end of the twisted wire and finally means for expelling the finished lacing from the carrier, substantially as described.

2. In a machine for applying wire tips on lacings, the combination with a table with means for intermittently rotating the same, grippers or carriers on said table, and a series of stations with which each carrier is adapted to successively aline, mechanism for partly completing the work on said lacing being located at each station, means for pointing and piercing the end of the lacing located at the front station, said means comprising a stationary blade, of the shape it is desired to cut the lacing, and a movable blade coacting therewith, to shear off the edges of the lacing, a piercer carried by the movable blade and means for reciprocating the latter blade, substantially as described.

3. In a machine for applying wire tips on lacings, the combination with a table with means for intermittently rotating the same, grippers or carriers on said table, and a series of stations with which each carrier is adapted to successively aline, mechanism for partly completing the work on said lacing being located at each station, of means for threading the wire which is to be twisted through the pierced and tapered lacing end, and for cutting off a length of wire located at the second station comprising wire-feeding rollers and a wire-guide, means for raising said guide and rollers toward and from the table, a knife for cutting off a length of wire moving transversely of the wire-guide, and means including a reciprocating rack-bar for rotating the feed-rollers and operating said cutter, substantially as described.

4. In a machine for applying wire tips on lacings, the combination with a table with means for intermittently rotating the same, grippers or carriers on said table, and a series of stations with which each carrier is adapted to successively aline, mechanism for partly completing the work on said lacing being located at each station, means for twisting the threaded wire around the lacing comprising steadying-pincers adapted to grip the end of the lacing, pivoted jaws adapted to grip the wire projecting on each side of the same, and means for simultaneously rotating the jaws and feeding the pincers and jaws toward the extremity of the lacing, substantially as described.

5. In a machine for applying wire tips on lacings, the combination with a table with means for intermittently rotating the same, grippers or carriers on said table, and a series of stations with which each carrier is adapted to successively aline, mechanism for partly completing the work on said lacing being located at each station, means for cutting off the end of the twisted wire located at the fourth station comprising stationary and pivoted blades, and means operated from the main drive-shaft to move said pivoted blade, substantially as described.

6. The combination with a table, means for rotating the same step by step, a series of lace-holders including cones projecting from the face of the table having axial bores and radial slots leading through the edge of the table and cones to the bores, a series of spring-grippers pivoted to the face of the table one for each cone, and coacting with the bores of the cones to retain the lacings therein, and a stationary cam with which said grippers are designed to coact whereby the latter are forced back and devices for expelling the lacing when the grippers are released.

7. The combination with a table, a series of pockets to receive the lacing, cones projecting from the face of the table forming a part of each pocket, means for cutting and piercing the lacing including the blades and a boxing carrying the same with which each cone is adapted to aline during the rotation of the table, means for moving the cutting and piercing mechanism vertically and a conical socket in the boxing comprising said blades, said socket being adapted to fit down over the cones to accurately aline the operating parts, substantially as described.

It witness whereof I have hereunto set my hand in presence of two witnesses.

FREDERICK THOMAS ADAMS.

Witnesses:
 W. SWINDELL,
 W. H. BLOCKSIDGE.